Patented May 13, 1930

1,758,356

UNITED STATES PATENT OFFICE

KARL DAIMLER AND GERHARD BALLE, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR PREPARING NUCLEAR-SUBSTITUTED ARYLSULPHONIC ACIDS

No Drawing. Application filed March 16, 1927, Serial No. 175,927, and in Germany March 27, 1926.

The present invention relates to a process of preparing aryl-polysulfonic acids which are substituted by at least one alkyl group having more than two carbon atoms and to new compounds obtainable thereby.

In our copending application Serial No. 95,770, filed March 18, 1926, there is described a process of preparing substituted aryl-polysulfonic acids, which comprises treating a mixture of an aromatic hydrocarbon and an alcohol of higher molecular weight than ethyl alcohol with a stronger sulfonating agent than sulfuric acid monohydrate.

We have now found that one may use in this process as starting material instead of the aromatic hydrocarbon a sulfonic acid of an aromatic hydrocarbon, provided that the said sulfonic acid compound is used in an utmost anhydrous state. This condition can best be fulfilled by using a sulfonic acid which has been prepared by means of chlorosulfonic acid, or a sulfonic acid which, though obtained by means of sulfuric acid, has subsequently been freed from the water by heat or, if required, by evacuation or any other method. By thus employing finished anhydrous sulfonic acids instead of unsulfonated hydrocarbons, it is possible to obtain variations regarding the position of the sulfo groups; for instance in the preparation of naphthalene derivatives a simultaneous sulfonation in the α- and β-position in contrast with the sulfonation as referred to in our said pending application which occurs almost exclusively in α-position or α-α-position. These variations may involve an important advantage for certain purposes for which the arylsulfonic acids in question are to be used.

The following example serves to illustrate our invention, but it is not intended to limit the invention thereto.

Into 1280 parts of molten naphthalene are introduced at 135–145° C. 1200 parts of chlorosulfonic acid: this mixture is stirred for some time, cooled down to 70° C. and there are then slowly run into it at 60–70° C. 800 parts of butyl alcohol and at the same time 600 parts of chlorosulfonic acid. After some hours, there are again run into the mixture 400 parts of chlorosulfonic acid. As soon as the product has become entirely soluble in water, it is worked up into its dry sodium salt. The yield amounts to about 3600 kilogrammes, the product being a light-colored powder, which is readily soluble in water and which can be used with particular advantage as a wetting agent, an emulsifying agent or the like.

We claim:

1. The process of preparing substituted aryl-polysulfonic acids which comprises treating a mixture of an aromatic hydrocarbon sulfonic acid compound which is in a completely dry form and an alcohol of higher molecular weight than ethyl alcohol with a stronger sulfonating agent than sulfuric acid monohydrate.

2. The process of preparing substituted aryl-polysulfonic acids which comprises treating a mixture of an aromatic hydrocarbon sulfonic acid compound which is in a completely dry form and an alcohol of higher molecular weight than ethyl alcohol with chlorosulfonic acid.

3. The process which comprises introducing about 1280 parts of molten naphthalene into 1200 parts of chlorosulfonic acid at a temperature of about 135° to 145° C., cooling the mixture to about 70° C., adding then at a temperature of about 60° to about 70° C. about 800 parts of butyl alcohol and about 600 parts of chlorosulfonic acid, after some hours adding 400 additional parts of chlorosulfonic acid and causing the reaction components to act upon each other until the reaction product has become soluble in water.

4. As a new product a naphthalene polysulfonic acid compound which is substituted by at least one alkyl group having more than two carbon atoms and which has at least one of the α-positions and at least one of the β-positions substituted by a sulfonic acid group.

5. As a new product a butyl-naphthalene sulfonic acid compound which is substituted in at least one of its α-positions and in at least one of its β-positions by a sulfonic acid group.

In testimony whereof, we affix our signatures.

KARL DAIMLER.
GERHARD BALLE.